US010572470B2

United States Patent
Eda et al.

(10) Patent No.: US 10,572,470 B2
(45) Date of Patent: Feb. 25, 2020

(54) ENHANCED FSCK MECHANISM FOR IMPROVED CONSISTENCY IN CASE OF ERASURE CODED OBJECT STORAGE ARCHITECTURE BUILT USING CLUSTERED FILE SYSTEM

(71) Applicant: International Business Machines Corporation, Armonk, NY (US)

(72) Inventors: Sasikanth Eda, Pune (IN); Deepak R. Ghuge, Sangamner (IN); Huzefa H. Pancha, Pune (IN); Sandeep R. Patil, Pune (IN)

(73) Assignee: International Business Machines Corporation, Armonk, NY (US)

( * ) Notice: Subject to any disclaimer, the term of this patent is extended or adjusted under 35 U.S.C. 154(b) by 223 days.

(21) Appl. No.: 15/481,044

(22) Filed: Apr. 6, 2017

(65) Prior Publication Data

US 2018/0293265 A1 Oct. 11, 2018

(51) Int. Cl.
G06F 17/30 (2006.01)
G06F 16/23 (2019.01)

(52) U.S. Cl.
CPC .............................. G06F 16/2365 (2019.01)

(58) Field of Classification Search
CPC ............... G06F 16/162; G06F 16/2365; G06F 16/1724; G06F 16/1727; G06F 16/1748;
(Continued)

(56) References Cited

U.S. PATENT DOCUMENTS 7,818,302 B2 10/2010 Godbole
8,677,065 B1 3/2014 Cousins
(Continued)

OTHER PUBLICATIONS

"Erasure Code Support", OpenStack Foundation, http://docs.openstack.org/developer/swift/overview_erasure_code.html, swift 2.12.1.dev107 documentation, retrieved from the internet Feb. 20, 2017, 11 pages.
(Continued)

Primary Examiner — Greta L Robinson
(74) Attorney, Agent, or Firm — Stephen R. Tkacs; Stephen J. Walder, Jr.; Robert M. Sullivan

(57) ABSTRACT

A mechanism is provided in a data processing system comprising at least one processor and at least one memory, the at least one memory comprising instructions which are executed by the at least one processor and configure the processor to implement a file system consistency check utility on an erasure coded object storage architecture. Responsive to the file system consistency check utility determining a directory entry does not exist for a given file inode, the mechanism determines whether the given file is part of an erasure code schema of an object storage architecture. Responsive to the file system consistency check utility determining the given file/fragment is part of the erasure code schema, the mechanism determines a container (parent directory) for the given erasure code fragment, wherein the given fragment is a given error code fragment of an object, based on other erasure code fragments corresponding to the object and their placement schematics in the erasure code schema. Responsive to the file system consistency check utility determining the directory, the mechanism updates the directory entry with details of the given error code fragment.

18 Claims, 8 Drawing Sheets

(58) Field of Classification Search
CPC .. G06F 16/1752; G06F 3/0604; G06F 3/0608; G06F 3/0626; G06F 3/0631; G06F 3/064; G06F 3/0641; G06F 3/0649; G06F 3/0652; G06F 3/0653; G06F 3/0655; G06F 11/16
See application file for complete search history.

(56) References Cited

U.S. PATENT DOCUMENTS

| | | | | |
|---|---|---|---|---|
| 9,047,299 | B1* | 6/2015 | Ferrigno | G06F 16/1727 |
| 2008/0189343 | A1* | 8/2008 | Hyer | G06F 3/0614 |
| 2013/0282976 | A1* | 10/2013 | Dubnicki | G06F 12/00 711/112 |
| 2015/0278243 | A1 | 10/2015 | Vincent et al. | |
| 2016/0283372 | A1* | 9/2016 | Davis | G06F 12/0261 |
| 2017/0063397 | A1* | 3/2017 | Richardson | G06F 16/285 |

OTHER PUBLICATIONS

"Filesystems: A Brief Introduction", LINFO, http://www.linfo.org/filesystem.html, Apr. 16, 2004, 7 pages.

"What is metadata, and how does it aid in the "fsck" process?", Stack Exchange Inc, http://unix.stackexchange.com/questions/23252/what-is-metadata-and-how-does-it-aid-in-the-fsck-process, Unix & Linux Stack Exchange, Oct. 25, 2011, 2 pages.

Greenan, Kevin M. et al., "PRIMS: Making NVRAM Suitable for Extremely Reliable Storage", University of California, Storage Systems Research Center, HotDep'07, Proceedings of the 3rd workshop on Hot Topics in System Dependability, Jul. 26, 2007, 4 pages.

Rouse, Margaret, "What is erasure coding?",TechTarget, SearchStorage, http://searchstorage.techtarget.com/definition/erasure-coding, Nov. 2014, 5 pages.

* cited by examiner

FIG. 6
| INODE |
|---|
| Filetype |
| File permissions |
| Hard link count |
| UID |
| GID |
| Atime |
| Mtime |
| Ctime |
| Data block addresses |
| - A0-A9 single disk block addresses |
| - A10 single indirect |
| - A11 double direct |
| - A12 triple direct |
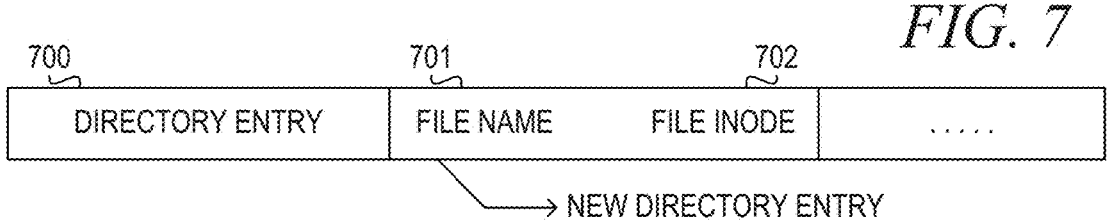
FIG. 7
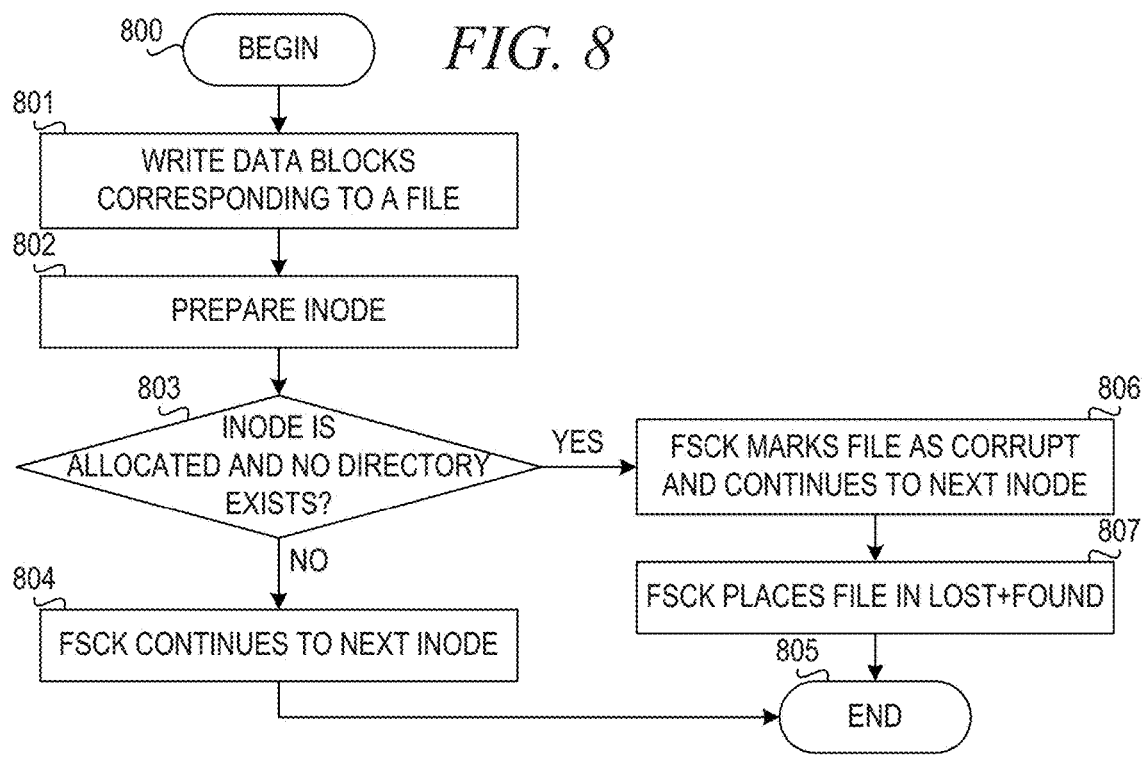
FIG. 8

ENHANCED FSCK MECHANISM FOR IMPROVED CONSISTENCY IN CASE OF ERASURE CODED OBJECT STORAGE ARCHITECTURE BUILT USING CLUSTERED FILE SYSTEM

BACKGROUND

The present application relates generally to an improved data processing apparatus and method and more specifically to enhanced fsck mechanisms for improved consistency in case of erasure coded object storage architecture built using clustered file system.

The system utility fsck (for "file system consistency check") is a tool for checking the consistency of a file system in UNIX™ and Unix-like operating systems, such as LINUX™ and OS X®. A similar command, CHKDSK exists in Microsoft® Windows®. Generally, fsck is run either automatically at boot time or manually by the system administrator. The command works directly on data structures stored on disk, which are internal and specific to the particular file system in use—so a matching fsck command tailored is generally required. The exact behaviors of various fsck implementations vary, but they typically follow a common order of internal operations and provide a common command-line interface to the user.

Most fsck utilities provide options for either interactively repairing damaged file systems (the user must decide how to fix specific problems), automatically deciding how to fix specific problems (so the user does not have to answer any questions), or reviewing the problems that need to be resolved on a file system without actually fixing them. Partially recovered files where the original file name cannot be reconstructed are typically recovered to a "lost+found" directory that is stored at the root of the file system. The file system is normally checked while unmounted, mounted read-only, or with the system in a special maintenance mode.

Erasure coding (EC) is a method of data protection in which data is broken into fragments, expanded and encoded with redundant data pieces and stored across a set of different locations or storage media. The goal of erasure coding is to enable data that becomes corrupted at some point in the disk storage process to be reconstructed by using information about the data that's stored elsewhere in the array. Erasure codes are often used instead of traditional redundant array of independent disks (RAID) because of their ability to reduce the time and overhead required to reconstruct data. The drawback of erasure coding is that it can be more processor-intensive, and that can translate into increased latency. Erasure coding can be useful with large quantities of data and any applications or systems that need to tolerate failures, such as disk array systems, data grids, distributed storage applications, object stores and archival storage. One common current use case for erasure coding is object-based cloud storage.

Erasure coding creates a mathematical function to describe a set of numbers so they can be checked for accuracy and recovered if one is lost. Referred to as polynomial interpolation or oversampling, this is the key concept behind erasure codes. In mathematical terms, the protection offered by erasure coding can be represented in simple form by the following equation: $n=k+m$. The variable "k" is the original amount of data or symbols. The variable "m" stands for the extra or redundant symbols that are added to provide protection from failures. The variable "n" is the total number of symbols created after the erasure coding process. For instance, in a 10 of 16 configuration, or EC 10/16, six extra symbols (m) would be added to the 10 base symbols (k). The 16 data fragments (n) would be spread across 16 drives, nodes or geographic locations. The original file could be reconstructed from 10 verified fragments.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided in a data processing system comprising at least one processor and at least one memory, the at least one memory comprising instructions which are executed by the at least one processor and configure the processor to implement a file system consistency check utility on an erasure coded object storage architecture. The method comprises responsive to the file system consistency check utility determining a directory does not exist for a given file, determining whether the given file is part of an erasure code schema of an object storage architecture. The method further comprises responsive to the file system consistency check utility determining the given file is part of the erasure code schema, determining a directory for the given file, wherein the given file is a given error code fragment of an object, based on other erasure code fragments corresponding to the object and their placement schematics in the erasure code schema. The method further comprises responsive to the file system consistency check utility determining the directory, updating a directory entry for the directory with details of the given error code fragment.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 6 illustrates information contained in an inode;

FIG. 7 illustrates a directory entry update on completion of writing data blocks corresponding to a file;

FIG. 8 is a flowchart illustrating a mechanism for file movement to a "lost+found" directory due to lack of directory entry;

DETAILED DESCRIPTION

Figure 1:
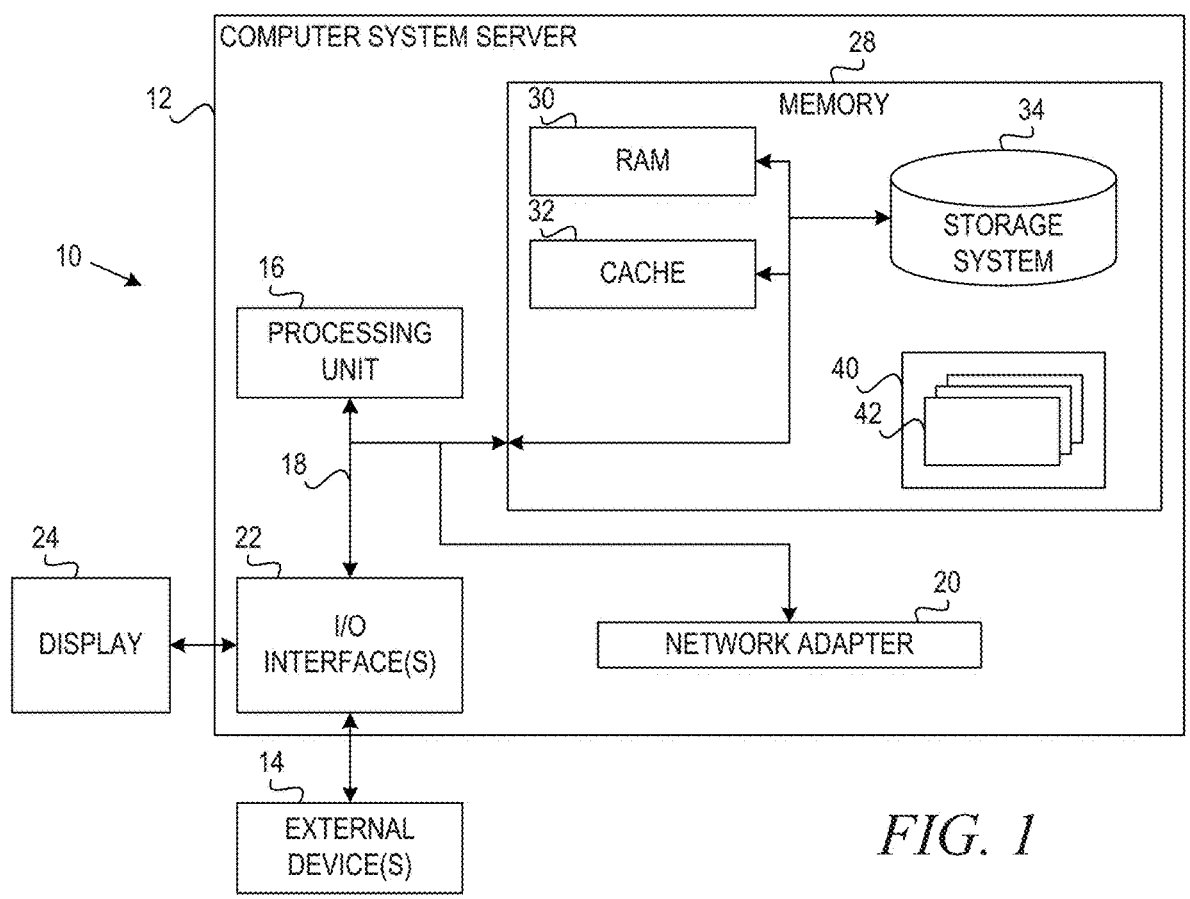
FIG. 1 depicts a cloud computing node according to an illustrative embodiment.

The illustrative embodiments provide mechanisms for enhanced fsck methodology to support better consistency in case of erasure coded object storage architecture built using a clustered file system. The mechanism can be integrated with a traditional fsck implementation and helps in offering a better enhancement by correcting the orphan inodes by leveraging the erasure code (EC) schema, enabling an ability to execute fsck per object (as opposed to executing fsck for a file system or for a single file), identifying the kind of workload if identified as a web scale workload to enable an efficient method to provision and execute fsck while the file system is online.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Object storage (also known as object-based storage) is a computer data storage architecture that manages data as objects, as opposed to other storage architectures like file systems which manage data as a file hierarchy and block storage which manages data as blocks within sectors and tracks. Each object typically includes the data itself, a variable amount of metadata, and a globally unique identifier. Object storage can be implemented at multiple levels, including the device level (object storage device), the system level, and the interface level. In each case, object storage seeks to enable capabilities not addressed by other storage architectures, like interfaces that can be directly programmable by the application, a namespace that can span multiple instances of physical hardware, and data management functions like data replication and data distribution at object-level granularity. Object storage is widely used in on-premises and public clouds.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
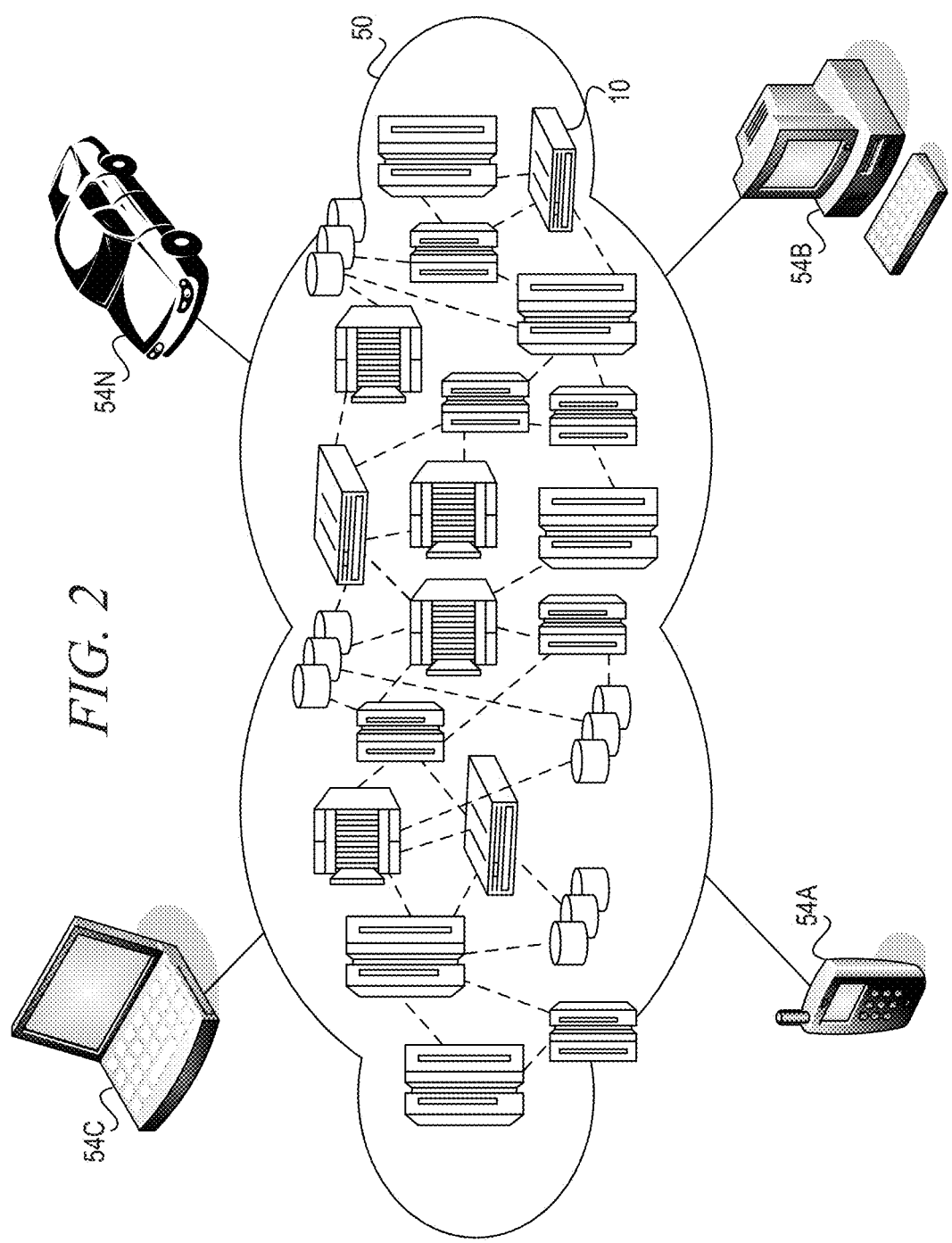
FIG. 2 depicts a cloud computing environment according an illustrative embodiment.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
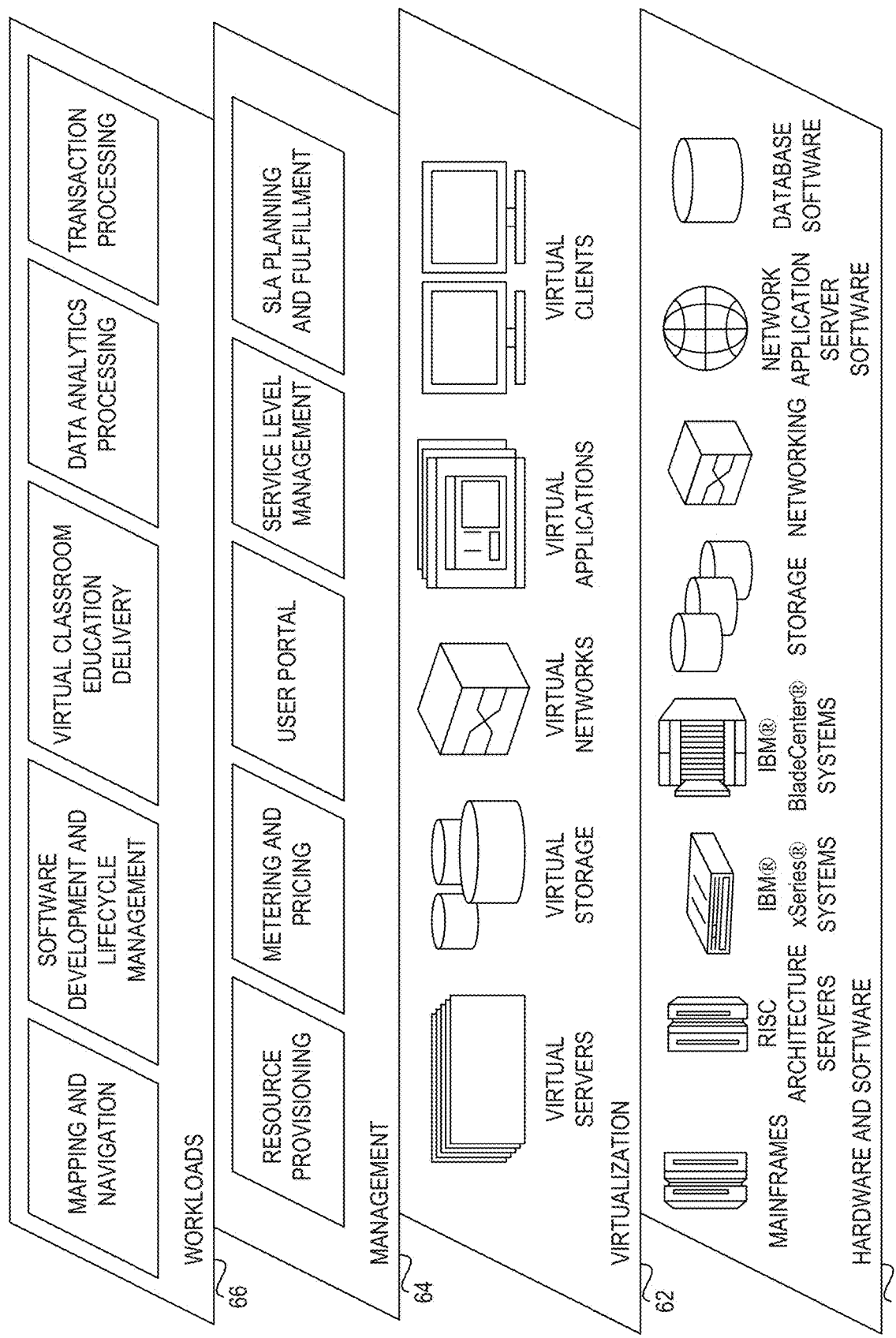
FIG. 3 depicts abstraction model layers according to an illustrative embodiment.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

Figure 4:
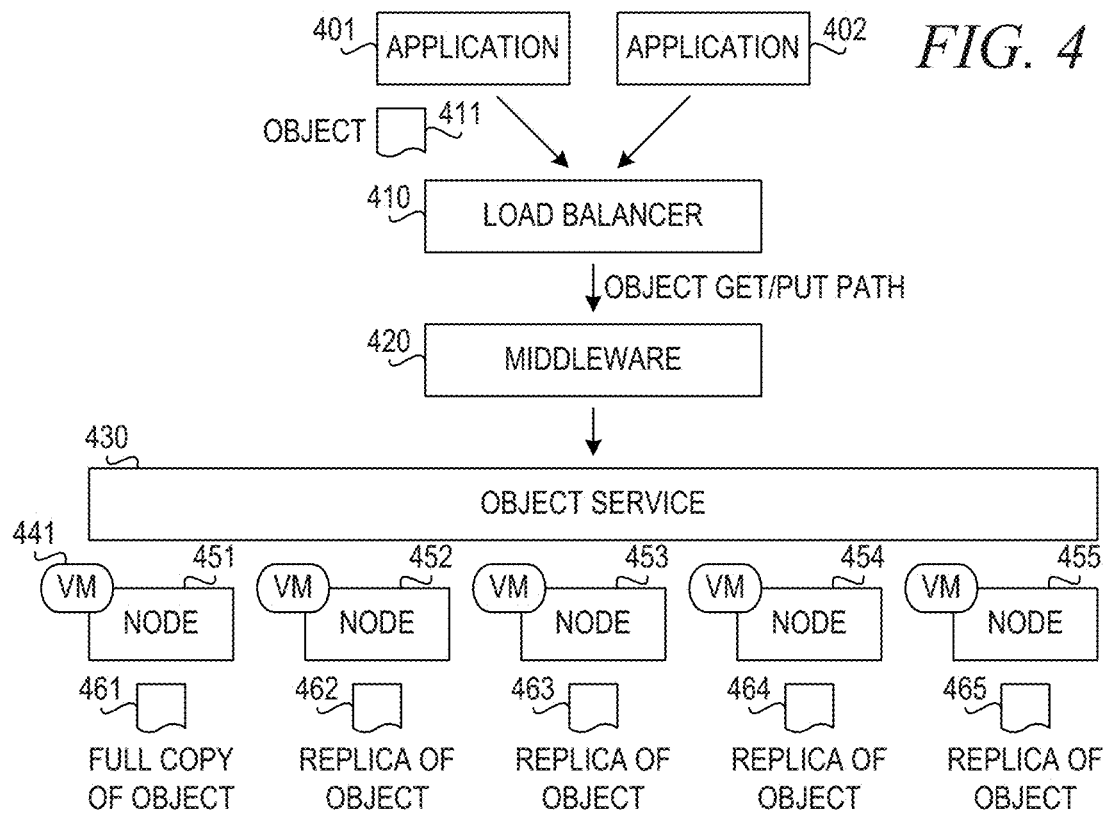
FIG. 4 is a block diagram illustrating a traditional object storage architecture.

FIG. 4 is a block diagram illustrating a traditional object storage architecture, which comprises two entities/node groups. One node group, referred to as "proxy nodes," is used for a distributed load handling/request handling nodes into the namespace. Another node group, referred to as "storage nodes," is responsible for writing to the disks/storage subsystems and this architecture purely serves as a storage unit/repository and for analysis (extracting meaningful information from raw data) of the data residing in these storage units, it would require an additional client or compute node.

Applicants 401, 402 upload objects, such as object 411 to load balancer 410, which sends the object to a proxy node running middleware. The middleware 420 may then decide on the storage node running object service 430. Object service 420 stores objects written from applications 401, 402 to storage nodes 451-455. Each node 451-455 may execute a virtual machine (VM), such as VM 441. In the depicted example, node 451 stores full copy of the object 461, and nodes 452-455 store replicas of the object 462-465.

Figure 5:
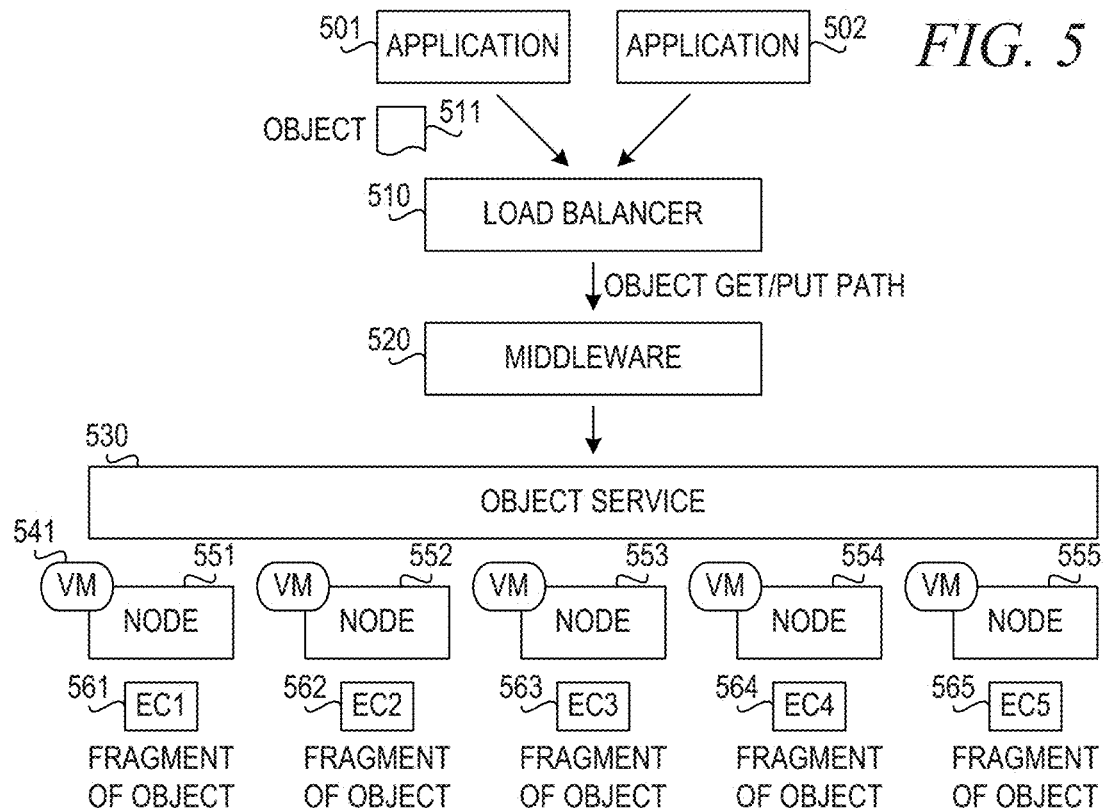
FIG. 5 is a block diagram illustrating an erasure code supported object storage architecture in which aspects of the illustrative embodiments may be implemented.

FIG. 5 is a block diagram illustrating an erasure code supported object storage architecture in which aspects of the illustrative embodiments may be implemented. Erasure coding is a method of data protection in which data is broken into fragments, expanded and encoded with redundant data pieces, and stored across a set of different locations or storage media. Applicants 501, 502 send objects, such as object 511, to be stored to load balancer 510. Middleware 520 sends the object 511 to object service 530. In the depicted example, load balancer 510 and middleware 520 are the proxy nodes.

In an erasure code supported object storage architecture, the received object to be stored is split into network chunks and each chunk is encoded with the erasure code (EC) schema. Each encoded chunk is referred as a fragment, and each fragment is stored on different locations per node. Thus, object service 520 stores objects written from applications 501, 502 to storage nodes 551-555. Each node 551-555 may execute a virtual machine (VM), such as VM 541. In the depicted example, nodes 551-555 store fragments of the object EC1-EC5 561-565.

FIG. 6 illustrates information contained in an inode. In a LINUX™/UNIX™ file system, the basic unit of storage is called inode. Each inode contains information about a file including (1) its inode number (a unique identification number); (2) the owner and group associated with the file: (3) the file type (e.g., whether it is a regular file or a directory); (4) the file's permission list: (5) the file creation, access, and modification times; (6) the size of the file; and, (7) the disk address (i.e., the location on the disk where the file is physically stored). An individual inode can either contain actual file data, contain directory entry information (metadata), or be unused (free). The act of creating a new file involves changing the state of an inode from free to allocated, writing data to the new file, and writing metadata to a directory file. It is possible for a computer to crash in the middle of this type of operation, in which case the file system can be corrupted. FIG. 6 shows the above and other information contained in an inode.

FIG. 7 illustrates a directory entry update on completion of writing data blocks corresponding to a file. Directory entry 700 includes file name 701 and file inode identifier 702 for a given inode. Directory entry 700 may include a plurality of such file name/file inode ID pairs for each inode/file in the directory. A given file name 701 may itself be a directory and point to a new directory entry.

The fsck (file system consistency checking) utility consists of reading all the inodes and attempting to resolve as many corruption issues as possible. For instance, suppose an inode is not on the list of free nodes but there are no directory entries that say that this inode is part of a file in any of the directories that the file system knows about. This inode can be placed on "lost+found" directory.

The prior art implementation of fsck involves reading inodes one by one from the inode list and verify whether any corruption (i.e., an inode is not listed as a free inode, but there is no directory entry that say this inode is part of a file in any of the directory) has occurred or not. If any such corruption is identified, the fsck implementation moves this inode to the "lost+found" directory. Similarly, the fsck implementation also tries to verify the correctness of metadata stored in the inode—say, for example, it can verify the size stored in the inode with the actual file size, etc.—and correct them to a possible extent.

For an object storage cluster built using a clustered file system, such as General Parallel File System (GPFS), the "lost+found" directory is created for each file system. For an object storage cluster built using a non-clustered file system, such as ext3, the "lost+found" directory is created per node.

With this kind of fsck implementation, consider an environment where erasure encoded (EC) object storage architecture (i.e., a container is represented as a physical directory on the file system and an object corresponding to a container will be represented as multiple EC fragments/files, and the number of EC fragments depend on the EC schema) is built using a clustered file system. In this scenario, assume the following:

1. While writing an EC container (directory inode), the server received an interrupt and corrupted the metadata, which correspond to EC fragments/file directory entry. In this case, the traditional fsck implementation identifies the inode corresponding to the EC fragment as orphan inode and moves the EC fragment to the "lost+found" directory. Lacking awareness of this movement, the EC schema recalculates the missing EC fragment.

2. The traditional fsck implementation lacks the ability to run fsck per object. Traditional fsck can be programmed to run on inode corresponding to a single file. This model is suited for erasure coded object storage architecture where the file system lacks the ability to identify the EC fragments/files that correspond to a single object.

3. The traditional fsck cannot be used on an online file system used for cloud storage. Object storage and cloud storage are designed to support massive storage/WORM (write-once-read-many) workloads with maximum availability. With this kind of architecture built on a clustered file system, it is more difficult to identify the period where the file system can be brought offline such that fsck can be executed for consistency. The traditional fsck implementation lacks the ability to identify the type of workload (object storage workload) and accordingly keep the file system online to perform the file system correction.

FIG. 8 is a flowchart illustrating a mechanism for file movement to a "lost+found" directory due to lack of directory entry. Operation begins for a given file (block 800), and the mechanism writes data blocks corresponding to a given file (block 801). The mechanism (e.g., the file system or storage architecture) prepares an inode for the given file (block 802). The mechanism (e.g., the fsck utility) determines whether the file has an inode allocated and no directory exists (block 803). If the mechanism determines that a directory exists for the inode, then the fsck utility continues to the next inode (block 804). Thereafter, operation ends (block 805).

If the file has an inode allocated and no directory exists, then the fsck utility marks the file as corrupt and continues to the next inode (block 806). Then, the fsck utility places the file in the "lost+found" directory (block 807). Thereafter, operation ends (block 805).

The process shown in FIG. 8 results an increase in processor cycles in case of erasure coded object storage architecture, because the EC fragment is moved to a different location and by nature of the EC schema is reconstructed immediately.

The mechanism of the illustrative embodiments provides the following features and flexibility to the traditional fsck implementation in case of erasure coded (EC) object storage architecture: metadata correction (update parent directory details) in case of orphaned inode, an ability to execute fsck per object where the object is a group of multiple EC fragments, and using optimized fsck mechanism on an online file system used for cloud storage.

Metadata correction: Assume that while writing an EC container (directory inode), a server received an interrupt and corrupted the metadata that correspond to EC fragments/ file directory entry. In this scenario the traditional fsck moves the inode corresponding to the EC fragment that lacks parent directory details to a different directory named "lost+found." As a result, the object storage EC schema, which is not aware of this movement, tries to reconstruct the missing EC fragment, which is more time and processor consuming. Instead, the mechanism of the illustrative embodiments integrated with fsck implementation identifies the workload/purpose served by namespace. If serving erasure encoded object storage work load and fsck encounters an orphan inode of an EC fragment, the mechanism leverages the object EC schema and uses the other remaining EC fragments of the object to get the container/parent directory details (inodes and obtained), and this will be used to correct the EC container directory entry of EC fragment under subjection. Similarly, for other metadata field corrections, such as size, creation time, etc., the mechanism uses EC schema to locate the object metadata EC fragment, performs a comparison with inode vs. container of metadata EC fragment and performs correction of the metadata accordingly.

fsck per object: With respect to the ability to execute fsck per object, the traditional fsck algorithm can be programmed to use metadata correction for a single file inode correction. It fails to execute in case of EC object storage architecture given that each object is split into multiple fragments/files and the file system is unaware of the related EC fragments that correspond to a single object. The mechanism of the illustrative embodiment enables fsck when selected for correcting an object, uses the EC schema and EC locators to obtain the physical location of EC fragments/files that correspond to the subjected object, and selectively runs the fsck for metadata correction.

Online file system: The mechanism of the illustrative embodiments identifies the workload/purpose served by namespace. If the identified workload corresponds to write-once-read-many (WORM) or a typical object storage workload, it enables an optimized mechanism such that the file system offline period is very low. The mechanism collects a snapshot (the snapshot mechanism can be point-on-write, collect the copy, store the changes using a special bit of the disk) of the intended namespace and the collected snapshot is used for fsck analysis. The metadata corrections are made to the snapshot, diff patches of the internal data structure is prepared. It also monitors the namespace change after snapshot collection. If the changes are non-conflicting related to the corruption inodes, the patch diffs are applied automatically while the file system is online.

Figure 9:
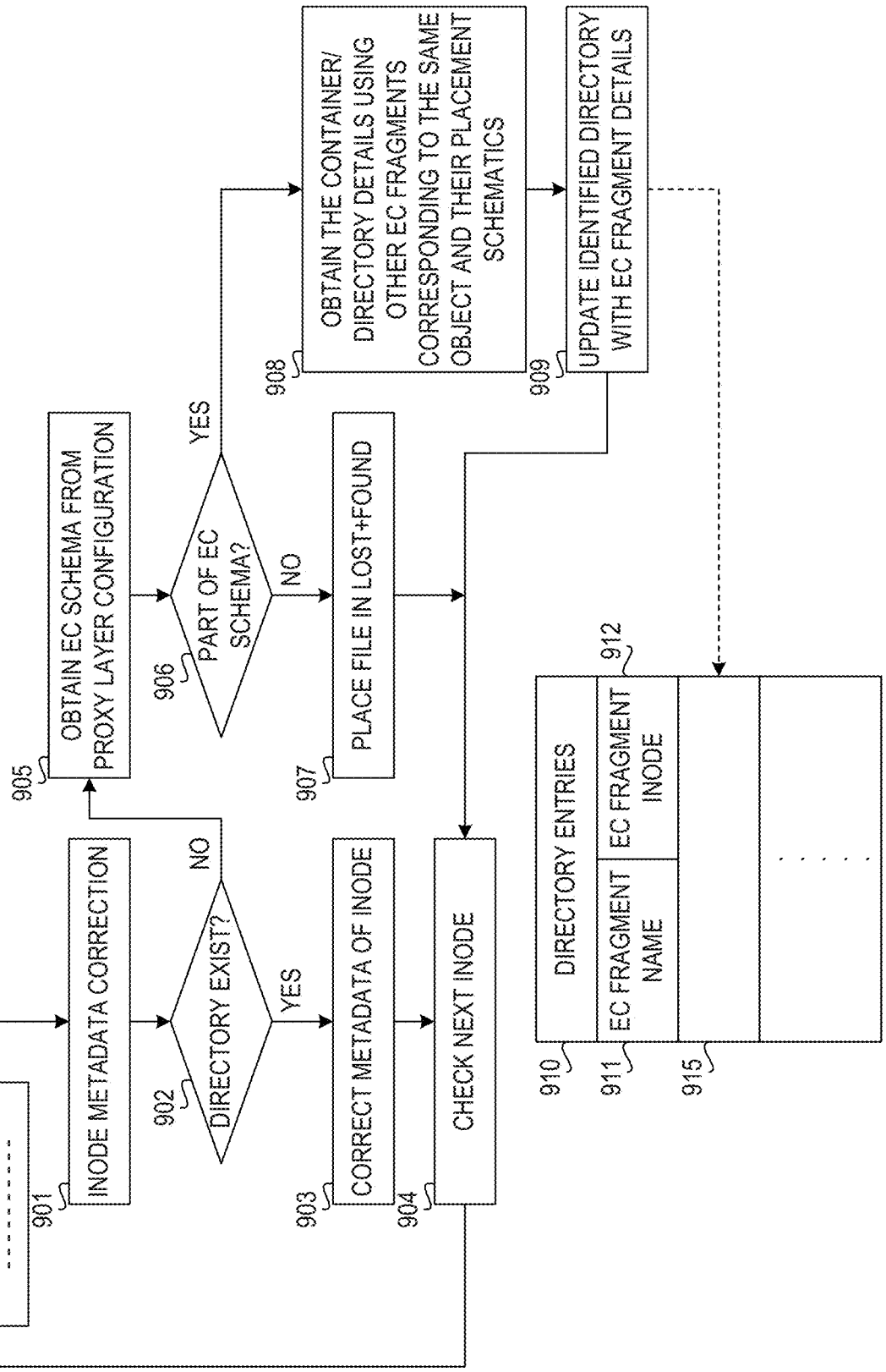
FIG. 9 is a flowchart illustrating operation of a mechanism that enables directory/container entry update in case of an orphan EC fragment in accordance with an illustrative embodiment.

FIG. 9 is a flowchart illustrating operation of a mechanism that enables directory/container entry update in case of an orphan EC fragment in accordance with an illustrative embodiment. Operation begins with the fsck utility taking a next inode from an inode list 900. The fsck utility performs inode metadata correction (block 901). The fsck utility determines whether a directory exists for the file the inode represents (block 902). If the directory exists, the fsck utility corrects metadata of the inode (block 903) and checks the next inode in the inode list 900 (block 904). The process then repeats for the next inode.

If the directory does not exist in block 902, the fsck utility obtains the EC schema from the proxy layer configuration (block 905). The fsck utility determines whether the inode is part of the EC schema (block 906). If the inode is not part of the EC schema, then the fsck utility places the file in the "lost+found" directory (block 907) and checks the next inode (block 904).

If the inode is part of the EC schema in block 906, then the fsck utility obtains the container/directory details using other EC fragments corresponding to the same object and their placement schematics (block 908). The fsck utility updates the identified directory with the EC fragment details corresponding to the inode (block 909). Then, the fsck utility checks the next inode (block 904).

In block 909, the fsck utility updates the identified directory in directory entries 910. Each directory entry 910 has a list of inodes, each including an EC fragment name 911 and an EC fragment inode 912. Thus, the fsck utility may update a next entry 915 for the given inode being processed.

Implementation 1 (OpenStack Swift):

Assume a traditional commodity erasure coded storage cluster built using a clustered or non-clustered file system using EC schema 6/2 (number of data fragments=4, number of parity fragments=2, and number of storage nodes=6). In this case, consider an object "obj1" PUT is received at the proxy layer. The received object along with the EC schema are sent to the EC library encoder, which in turn splits the object chunks into multiple fragments and uses the RING (data structure) to determine the respective storage path per object fragment. Below is a sample illustration of EC fragments corresponding to single object:

/mnt/sdb5/z1device2/objects-2/513/6bd/
805a07b9099ea4e767684729d104a6bd$ 1s
   1460019319.22516#0.data
/mnt/sdb7/z1device4/objects-2/513/6bd/
805a07b9099ea4e767684729d104a6bd$ 1s
   1460019319.22516#1.data
/mnt/sdb6/z1device6/objects-2/513/6bd/
805a07b9099ea4e767684729d104a6bd$ 1s
   1460019319.22516#2.data
/mnt/sdb8/z1device5/objects-2/513/6bd/
805a07b9099ea4e767684729d104a6bd$ 1s
   1460019319.22516#3.data
/mnt/sdb1/z1device1/objects-2/513/6bd/
805a07b9099ea4c767684729d104a6bd$ 1s
   1460019319.22516#4.data
/mnt/sdb3/z1device3/objects-2/513/6bd/
805a07b9099ea4e767684729d104a6bd$ 1s
   1460019319.22516#5.data Note that the storage path (objects-2/513/6bd/805a07b9099ea4e7676684729d04a6bd) is common across all nodes, the object name (1460019319.22516) is common across all nodes but is suffixed with fragment index. However the associated storage devices are different per storage node (sdb5, sdb7, sdb6, sdb8, sdb1, sdb3).

In this kind of scenario, assume if a fragment write (e.g., 1460019319.22516#5.data) got corrupted and resulted in an orphan inode. The traditional fsck algorithm scans the entire namespace and identifies this orphan fragment and moves it to the "lost+found" directory corresponding to that storage node.

The mechanism of the illustrative embodiment acts during fsck correction (avoids EC reconstruction) and performs following operations:

1. Collect the fragment/file name (e.g., 1460019319.22516), which is moved to the "lost+found" directory, as an input.

2. Pass the fragment/file name (excluding the index) to the search function, which searches for existence of fragment/file with same name across the peer node (choose the peer node based on the network and compute resources) and collects the storage path of found fragment file as output (e.g., objects-2/513/6bd/805a07b9099ca4e767684729d104a6bd).

(Example storage path format: /objects-<policy>/<partition_number>/suffix/<hash_of_object>)

3. Perform an object information request on the fragment file with the same name found on the peer node to obtain the account, container, object name.

(Example showing the object-info for fragment file "1460019319.22516#3.data" found on peer node).

swift-object-info/mnt/sdb8/z1device5/objects-2/513/6bd/805a07b9099ea4e767684729d104a6bd/1460019319.22516#3.data
   Path:/AUTH_test/ec_cont0/f1
   Account: AUTH_test
   Container: ec_cont0
   Object: f1
   Object hash: 805a07b9099ea4e767684729d104a6bd
   Content-Type: application/octet-stream
   Timestamp: 2016-04-07T08:55:19.225160 (1460019319.22516)
   System Metadata:
   X-Object-Sysmeta-Ec-Content-Length: 29
   X-Object-Sysmeta-Ec-Etag: b5f57d3403174363e4ab5316f228b8cc
   X-Object-Sysmeta-Ec-Frag-Index: 3
   X-Object-Sysmeta-Ec-Scheme: liberasurecode_rs_vand 4+2
   X-Object-Sysmeta-Ec-Segment-Size: 1048576
   User Metadata:
   X-Object-Meta-Mtime: 1460019294.570782
   Other Metadata:
   No metadata found
   ETag: 65759355bbda4092609a771c5c3b5cb5 (valid)
   Content-Length: 88 (valid)
   Partition 513
   Hash 805a07b9099ea4e767684729d104a6bd 4. Use the account name, container name, object name obtained in the above step to retrieve the complete set of virtual device IDs or directory names used by the object.

swift-get-nodes/etc/swift/account.ring.gz AUTH_test ec_cont0 f1
   Account AUTH_test
   Container ec_cont0
   Object f1
   Server:Port Device 9.118.36.151:6022 z1device2
   Server:Port Device 9.118.36.152:6042 z1device4
   Server:Port Device 9.118.36.153:6012 z1device1
   Server:Port Device 9.118.36.154:6032 z1device3 [Handoff]
   Use your own device location of servers:
   such as "export DEVICE=/srv/node"
   ssh 9.118.36.151 "1s-1ah ${DEVICE:-/srv/node*}/z1device2/objects/513/6bd/805a07b9099ea4e767684729d104a6bd"
   ssh 9.118.36.152 "1s-1ah ${DEVICE:-/srv/node*}/z1device4/objects/513/6bd/805a07b9099ea4e767684729d104a6bd"
   ssh 9.118.36.153 "1s-1ah ${DEVICE:-/srv/node*}/z1device1/objects/513/6bd/805a07b9099ea4e767684729d104a6bd"
   ssh 9.118.36.154 "1s-1ab ${DEVICE:-/srv/node*}/z1device3/objects/513/6bd/805a07b9099ea4e767684729d104a6bd" # [Handoff]

5. Query the RING to obtain the storage device (e.g., sdb3) associated with the respective storage node (the node at which fsck moved the orphan fragment file to the "lost+found" directory).

6. Use the fragment name (1460019319.22516#5.data), path returned by the search function (/objects-2/513/6bd/805a07b9099ea4e767684729d104a6bd), storage device name (sdb3), mount point path (/mnt), virtual device ID (z1device3) to construct the entire path to orphan fragment.

7. Move the orphan fragment to the above calculated path, updating the directory details.

8. Verify the object recovery by utilizing the moved/corrected fragment file and by using the internal REST client.

In the same environment, assume the system, user metadata is corrupted (i.e., metadata key exists with no values defined). The illustrative embodiment uses the metadata available from other fragments (obtained at step-3) to correct or populate the metadata fields of the fragment marked as corrupted by fsck.

Implementation 2:

Assume a variation of erasure coded object storage cluster implementation built using a non-clustered file system using EC schema 6/2 (i.e., number of data fragments=4, number of parity fragments=2, and number of storage nodes=6).

In this case consider an object "obj1" PUT is received at the proxy layer. The received object along with the EC schema is sent to EC library encoder, which in turn splits the chunks to multiple fragments and creates below show storage hierarchy per object fragment.

/sdb1/account1/container1/object1/$ 1s
   1460019319.22516#0.data
   #/sdb2/account1/container1/object1/$ 1s
   1460019319.22516#1.data
   #/sdb3/account1/container1/object1/$ 1s
   1460019319.22516#2.data
   #/sdb4/account1/container1/object1/$ 1s
   1460019319.22516#3.data
   #/sdb5/account1/container1/object1/$ 1s
   1460019319.22516#4.data
   #/sdb6/account1/container1/objects1/$ 1s
   1460019319.22516#5.data Note that the storage path (/account1/container1/object1) is common across all nodes, the object name (1460019319.22516) is common across all nodes but are suffixed with fragment index. However the associated storage devices are different per storage node (sdb1, sdb2, sdb3, sdb4, sdb5, sdb6).

In this kind of scenario, assume if a fragment write (e.g., 1460019319.22516#5.data) got corrupted and resulted in an orphan inode. The traditional fsck algorithm scans the entire namespace and identifies this orphan fragment and moves it to the "lost+found" directory corresponding to that storage node.

The illustrative embodiment acts during fsck correction (avoids EC reconstruction) and performs following operations:

1. Collect the fragment/file name (e.g., 1460019319.22516) (which is moved to the "lost+found" directory) as an input.

2. Pass the fragment/file name (excluding the index) to the search function, which searches for existence of fragment/file with same name across the peer node (choose the peer node based on the network and compute resources) and collects the storage path of found fragment file as output (e.g., /account1/container1/object1/).

(Example storage path format: /account_name/container_name/object_name/)

3. Query to identify the storage device (Ex: sdb6) associated with the respective storage node (the node at which fsck moved the orphan fragment file to the "lost+found" directory).

4. Use the fragment name (1460019319.22516#5.data), path returned by the search function (/account1/container1/object1/), storage device name (sdb6) to construct the entire path to orphan fragment.

5. Move the orphan fragment to the above calculated path, updating the directory details.

6. Verify the object recovery by utilizing the moved/corrected fragment file and by using the internal REST client.

In the same environment, assume the system, user metadata is corrupted (i.e., metadata key exists with no values defined). The illustrative embodiment uses the metadata available from other fragments (obtained at step-2) to correct or populate the metadata fields of the fragment marked as corrupted by fsck.

Implementation 3:

Assume a variation of erasure coded object storage cluster implementation built using a non-clustered file system using EC schema 6/2 (i.e., number of data fragments=4, number of parity fragments=2, and number of storage nodes=6).

In this case consider an object "obj1" PUT is received at the proxy layer. The received object along with the EC schema is sent to EC library encoder, which in turn splits the chunks to multiple fragments and uses the placement algorithm to determine the respective storage path per object fragment. Below is a sample illustration of EC fragments corresponding to single object.

/mnt/sdb1/1/node/sdb5/objects-2/513/6bd/805a07b9099ca4e767684729d104a6bd$ 1s
  1460019319.22516#0.data
/mnt/sdb1/3/node/sdb7/objects-2/513/6bd/805a07b9099ea4e767684729d104a6bd$ 1s
  1460019319.22516#1.data
/mnt/sdb1/2/node/sdb6/objects-2/513/6bd/805a07b9099ea4e767684729d104a6bd$ 1s
  1460019319.22516#2.data
/mnt/sdb11/4/node/sdb8/objects-2/513/6bd/805a07b9099ea4e767684729d104a6bd$ 1s
  1460019319.22516#3.data
/mnt/sdb1/1/node/sdb1/objects-2/513/6bd/805a07b9099ea4e767684729d104a6bd$ 1s
  1460019319.22516#4.data
/mnt/sdb1/3/node/sdb3/objects-2/513/6bd/805a07b9099ea4e767684729d104a6bd$ 1s
  1460019319.22516#5.data However each fragment is appended with metadata that contains account name, container name, object name.

In this type of environment, the steps are same as of Implementation 1. However it excludes step-3.

Figure 10:
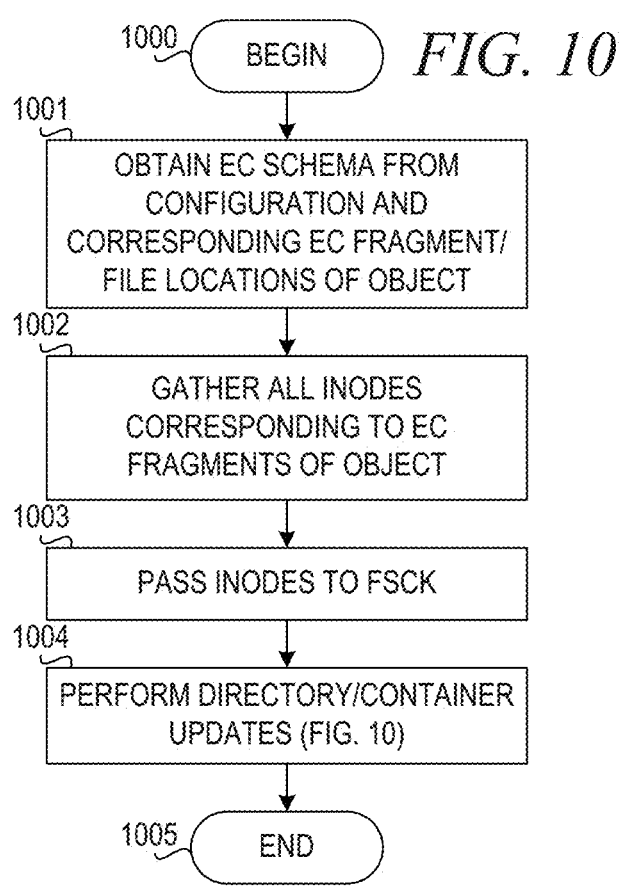
FIG. 10 is a flowchart illustrating operation of a mechanism to enable an ability to run fsck per object in accordance with an illustrative embodiment.

FIG. 10 is a flowchart illustrating operation of a mechanism to enable an ability to run fsck per object in accordance with an illustrative embodiment. Operation begins for a specified object (block 1000), and the mechanism obtains the EC schema from configuration and corresponding EC fragment/file locations of the object (block 1001). The mechanism then gathers all inodes corresponding to the EC fragments of the object (block 1002). The mechanism passes the inodes to the fsck utility (block 1003). The fsck utility then performs the directory/container updates as described above with reference to FIG. 9 (block 1004). Thereafter, operation ends.

The fsck utility takes the object name as input and queries the data placement algorithm about the object fragment storage paths. Once the fragment storage paths are identified, the fsck utility selectively verifies the inode content of fragments.

Figure 11:
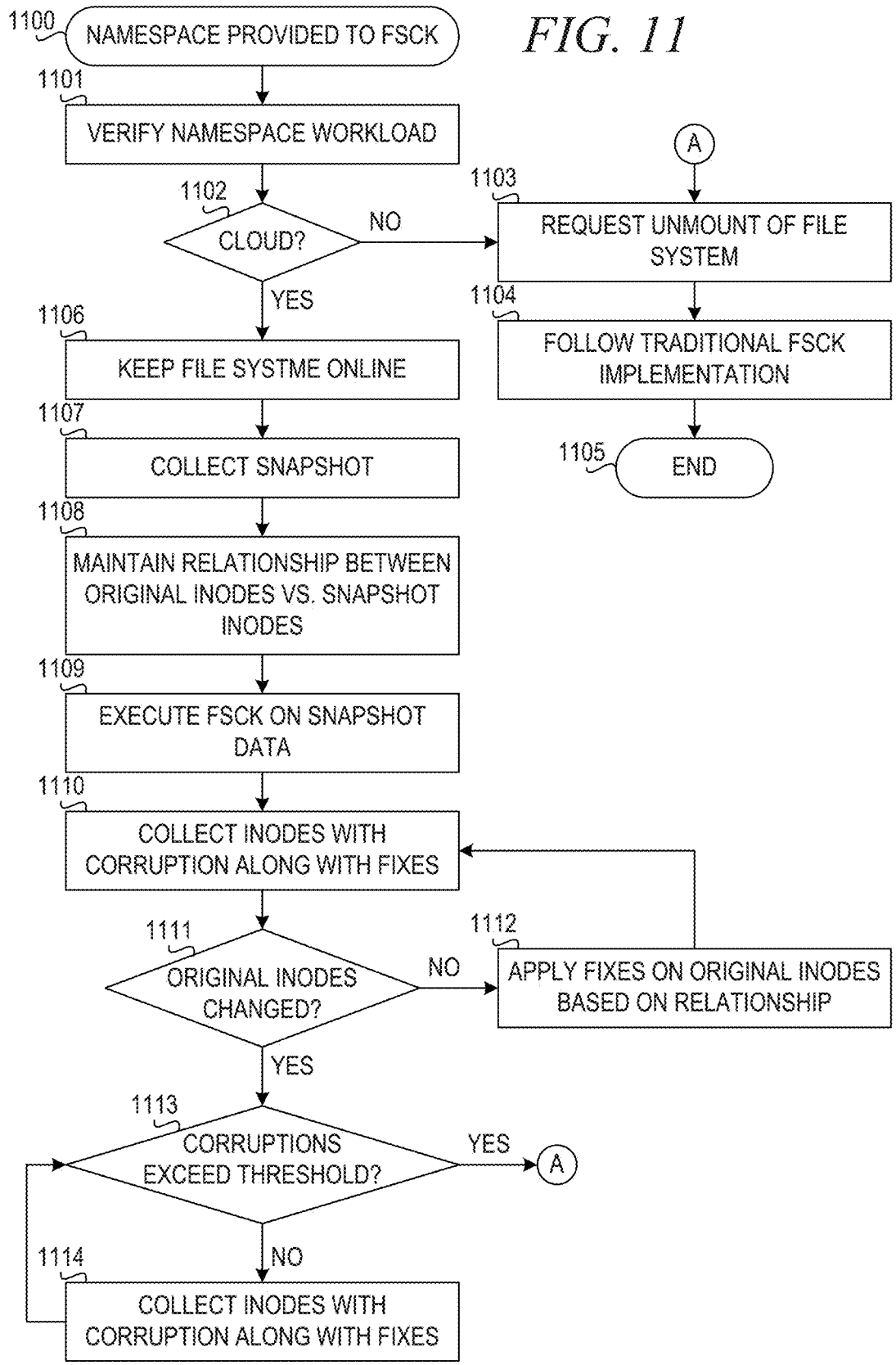
FIG. 11 is a flowchart illustrating operation of a mechanism to enable executing fsck on an online cloud storage namespace in accordance with an illustrative embodiment.

FIG. 11 is a flowchart illustrating operation of a mechanism to enable executing fsck on an online cloud storage namespace in accordance with an illustrative embodiment. Operation begins with a namespace (file system name) provided to the fsck utility (block 1100). The mechanism verifies the namespace workload (block 1101) and determines whether the name space is a cloud storage file system (block 1102). If the namespace is not for a cloud storage file system, then the mechanism request an unmount of the file system (take it offline) (block 1103) and follows the traditional fsck implementation (block 1104). Thereafter, operation ends (block 1105).

If the namespace is a cloud storage file system in block 1102, the mechanism keeps the file system online (block 1106) and collects a snapshot of the file system (block 1107). The mechanism maintains a relationship between the original inodes vs. the snapshot inodes (block 1108). The mechanism then executes the fsck utility on the snapshot data (block 1109).

The mechanism then collects inodes with corruption along with fixes (block 1110). The mechanism determines whether any original inodes have changed (block 1111). If no original inodes have changed, then the mechanism applies fixes on the original inodes based on the relationship (block 1112), and operation returns to block 1110 to collect inodes with corruption along with fixes.

If original inodes have changed in block 111, then the mechanism determines whether a number of corruptions exceeds a threshold (block 1113). The mechanism keeps a count of a number of inode corruptions and waits for multiple inode corruption accumulation. If the number of corruptions does not exceed the threshold, then the mechanism continues to collect inodes with corruption along with fixes (block 1114), and operation returns to block 1113.

If the number of corruptions does exceed the threshold in block 1113, then the mechanism request an unmount of the file system (take offline) (block 1103) and follows the traditional fsck implementation (block 1104). Thereafter, operation ends (block 1105).

In one embodiment, when the original inodes have changed in block 1111 but the number of corruptions does not yet exceed the threshold, the mechanism may prompt a user through a user interface to indicate whether the user wishes to take the file system offline to fix the corruptions. Thus, the mechanism may provide the added flexibility of keeping the file system online until a predetermined number of corruptions are encountered or allow the user to take the file system offline to fix the corruptions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and at least one memory, the at least one memory comprising instructions which are executed by the at least one processor and configure the processor to implement a file system consistency check utility on an erasure coded object storage architecture, the method comprising:

responsive to the file system consistency check utility determining a directory entry does not exist for a given file, determining whether the given file is part of an erasure code schema of an object storage architecture, wherein the given file is a given error code fragment of an object, wherein determining whether the given file is part of the erasure code schema comprises obtaining the error code schema from a proxy layer configuration of the object storage architecture:

responsive to the file system consistency check utility determining the given file is part of the erasure code schema, identifying a directory for the given file based on other erasure code fragments corresponding to the object and their placement schematics in the erasure code schema; and responsive to the file system consistency check utility identifying the directory for the given file, updating a directory entry for the directory for the given file with details of the given error code fragment.

2. The method of claim 1, wherein the details of the given error code fragment comprise an error code fragment name and an error code fragment inode identifier.

3. The method of claim 1, further comprising responsive to the file system consistency check utility determining a directory does exist for the given file, correcting metadata of an inode of the given file.

4. The method of claim 1, further comprising:
determining locations of a plurality of error code fragments of the object;
gathering all inodes corresponding to the plurality of error code fragments including the given error code fragment; and
passing the inodes to the file system consistency check utility.

5. The method of claim 1, further comprising:
responsive to determining that a workload of a namespace associated with a given file system is online cloud storage, collecting a snapshot of the given file system;
executing the file system consistency check utility on the snapshot of the given file system;
responsive to determining that original inodes of the given file system have changed, collecting inodes with corruptions, counting a number of corruptions, and responsive to the number of corruptions exceeding a threshold, taking the given file system offline and performing, by the file system consistency check utility, inode metadata corrections on the inodes with corruptions.

6. The method of claim 5, further comprising:
responsive to determining that the original inodes of the given file system have not changed, applying fixes to the original inodes based on a relationship between the original inodes and inodes in the snapshot data.

7. The method of claim 5, further comprising:
responsive to determining that the workload of the namespace associated with the given file system is not online cloud storage, taking the given file system offline and executing the file system consistency check utility on the given file system offline.

8. The method of claim 5, further comprising:
responsive to the number of corruptions not exceeding a threshold, prompting a user to indicate whether to take the file system offline to perform metadata corrections.

9. A computer program product comprising a computer readable storage medium having a computer readable program stored therein, wherein the computer readable program, when executed on a computing device, causes the computing device to implement a file system consistency check utility on an erasure coded object storage architecture, wherein the computer readable program causes the computing device to:

responsive to the file system consistency check utility determining a directory does not exist for a given file, determine whether the given file is part of an erasure code schema of an object storage architecture, wherein the given file is a given error code fragment of an object, wherein determining whether the given file is part of the erasure code schema comprises obtaining the error code schema from a proxy layer configuration of the object storage architecture;

responsive to the file system consistency check utility determining the given file is part of the erasure code schema, identify a directory for the given file based on other erasure code fragments corresponding to the object and their placement schematics in the erasure code schema; and responsive to the file system consistency check utility identifying the directory for the given file, update a directory entry for the directory for the given file with details of the given error code fragment.

10. The computer program product of claim 9, wherein the details of the given error code fragment comprise an error code fragment name and an error code fragment inode identifier.

11. The computer program product of claim 9, wherein the computer readable program further causes the computing device to:
responsive to the file system consistency check utility determining a directory does exist for the given file, correct metadata of an inode of the given file.

12. The computer program product of claim 9, wherein the computer readable program further causes the computing device to:
determine locations of a plurality of error code fragments of the object;
gather all inodes corresponding to the plurality of error code fragments including the given error code fragment; and
pass the inodes to the file system consistency check utility.

13. The computer program product of claim 9, wherein the computer readable program further causes the computing device to:
responsive to determining that a workload of a namespace associated with a given file system is online cloud storage, collect a snapshot of the given file system;
execute the file system consistency check utility on the snapshot of the given file system;
responsive to determining that original inodes of the given file system have changed, collect inodes with corruptions, count a number of corruptions, and responsive to the number of corruptions exceeding a threshold, take the given file system offline and perform, by the file system consistency check utility, inode metadata corrections on the inodes with corruptions.

14. The computer program product of claim 13, wherein the computer readable program further causes the computing device to:
responsive to determining that the original inodes of the given file system have not changed, apply fixes to the original inodes based on a relationship between the original inodes and inodes in the snapshot data.

15. The computer program product of claim 13, wherein the computer readable program further causes the computing device to:
responsive to determining that the workload of the namespace associated with the given file system is not online cloud storage, take the given file system offline and execute the file system consistency check utility on the given file system offline.

16. An apparatus comprising:
at least one processor, and
a memory coupled to the at least one processor, wherein the memory comprises instructions which, when executed by the at least one processor, cause the at least one processor to implement a file system consistency check utility on an erasure coded object storage architecture, wherein the instructions cause the processor to:
responsive to the file system consistency check utility determining a directory does not exist for a given file, determine whether the given file is part of an erasure code schema of an object storage architecture, wherein the given file is a given error code fragment of an object, wherein determining whether the given file is part of the erasure code schema comrises obtaining the error code schema from a proxy layer configuration of the object storage architecture:
responsive to the file system consistency check utility determining the given file is part of the erasure code schema, identify a directory for the given file based on other erasure code fragments corresponding to the object and their placement schematics in the erasure code schema; and
responsive to the file system consistency check utility identifying the directory for the given file, update a directory entry for the directory for the given file with details of the given error code fragment.

17. The apparatus of claim 16, wherein the instructions cause the processor to:
determine locations of a plurality of error code fragments of the object;
gather all inodes corresponding to the plurality of error code fragments including the given error code fragment; and
pass the inodes to the file system consistency check utility.

18. The apparatus of claim 16, wherein the instructions cause the processor to:
responsive to determining that a workload of a namespace associated with a given file system is online cloud storage, collect a snapshot of the given file system;
execute the file system consistency check utility on the snapshot of the given file system;
responsive to determining that original inodes of the given file system have changed, collect inodes with corruptions, count a number of corruptions, and responsive to the number of corruptions exceeding a threshold, take the given file system offline and perform, by the file system consistency check utility, inode metadata corrections on the inodes with corruptions.

* * * * *